J. A. McKAY.
STALK CUTTER.
APPLICATION FILED AUG. 12, 1908.
931,635.
Patented Aug. 17, 1909.
2 SHEETS—SHEET 1.
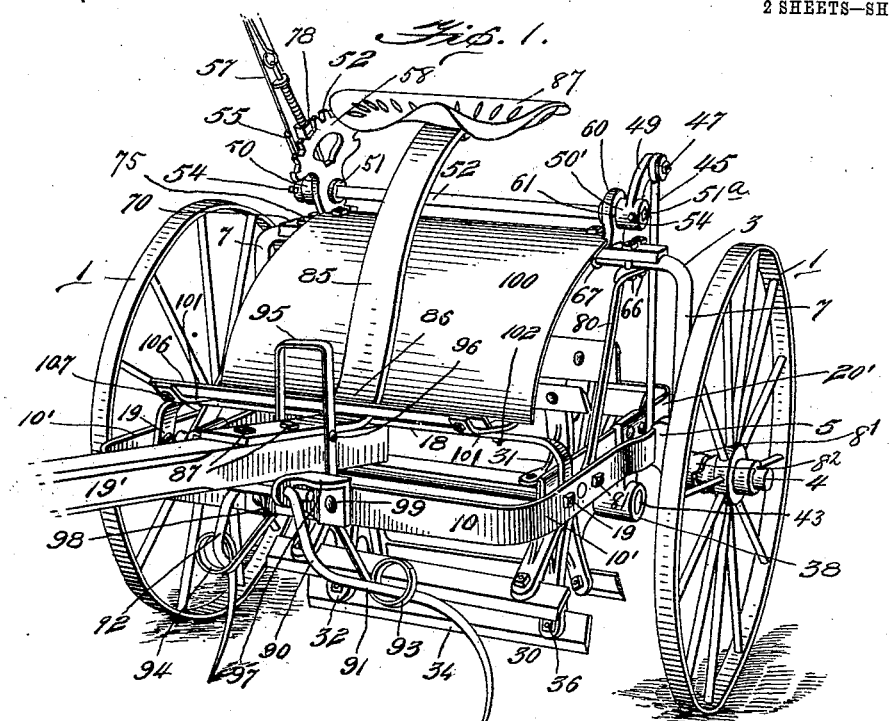
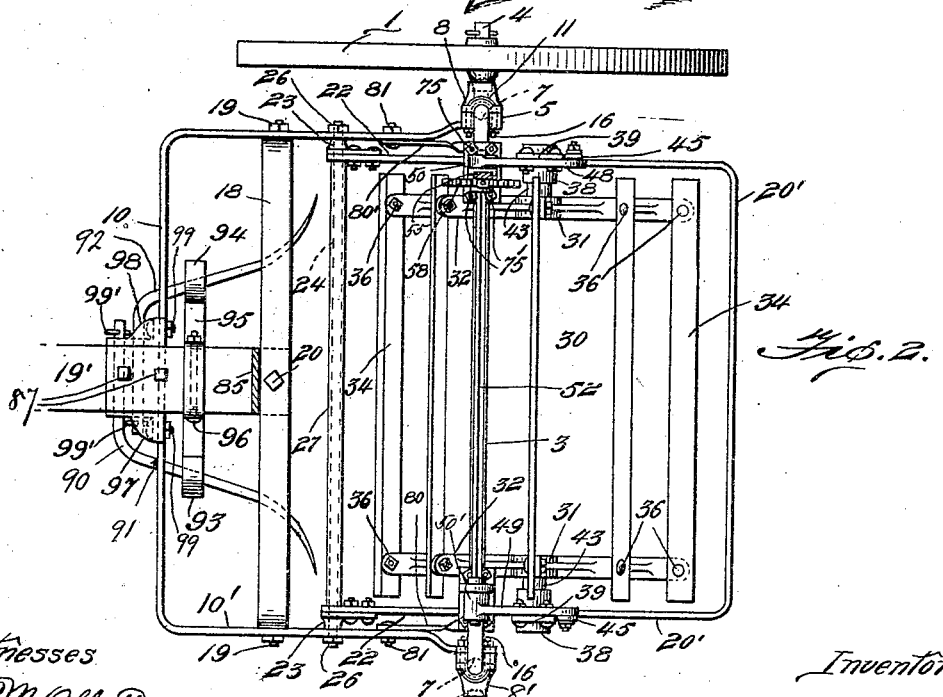
Witnesses
Inventor
John A. McKay
By C. A. Brandenburg
Atty.

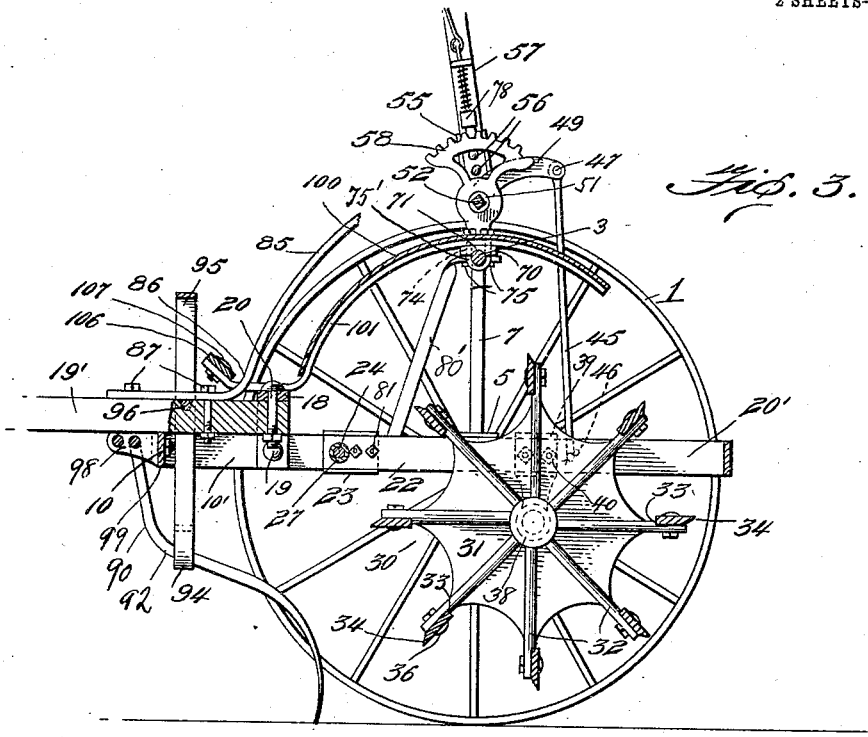

UNITED STATES PATENT OFFICE.

JOHN A. McKAY, OF DUNN, NORTH CAROLINA.

STALK-CUTTER.

No. 931,635.     Specification of Letters Patent.     Patented Aug. 17, 1909.

Application filed August 12, 1908. Serial No. 448,217.

*To all whom it may concern:*

Be it known that I, JOHN A. McKAY, a citizen of the United States, residing at Dunn, in the county of Harnett and State of North Carolina, have invented certain new and useful Improvements in Stalk-Cutters, of which the following is a specification.

My invention relates to stalk cutters adapted for cutting cotton, tobacco and corn stalks, and which may also be used for cutting weeds.

One of the objects of my invention is to provide a stalk cutter which is adapted to cut stalks closer to the ground and much shorter than other cutters with which I am acquainted and is not liable to choke during the cutting operation.

A further object of my invention is to provide a stalk cutter which shall be extremely simple and inexpensive in its construction, compact, strong and durable and which is easy on the operator and team.

A further object is to provide a stalk cutter adapted to serve as a harrow.

A further object is to provide a stalk cutter wherein the drag hooks may be readily operated by the foot of the operator for raising the stalks from the ground when they may have been blown down whereby they may be readily cut by the cutting blades.

A further object is to provide a stalk cutter wherein the cylinder which carries the cutting blades may be readily raised or lowered at will by the operator to regulate the pressure on the stalks.

Further objects and advantages of the invention will be apparent from the following description when taken in connection with the accompanying drawings.

The invention consists in the novel construction, arrangement and combination of parts as hereinafter fully described, shown in the accompanying drawings and pointed out in the appended claims.

In the drawings: Figure 1 is a perspective view of my improved stalk cutter, Fig. 2 is a plan view with the apron or fender removed, Fig. 3 is a vertical sectional view, Figs. 4 to 8 are detail views hereafter referred to.

In carrying out my invention I provide ground wheels 1, preferably constructed of steel, and mounted to turn on an axle 3, which is preferably constructed of a steel rod, and bent into U-shape with the projecting bearing ends 4. 5 indicates cast metal pieces each of which is provided with a semi-annular groove 6 adapted to receive an arm 7 of the axle, and 8 are cast metal pieces provided each with a semi-annular groove 9 to receive an arm 7; the pieces 5 and 8 coöperate to form sockets for the arms 7 of the axle; the piece 5 is arranged upon the inner side and the piece 8 on the outer side of each arm 7 and these pieces are adapted to be secured to a metal frame 10 by means of U-shaped bolts 11, the ends of which pass through alined openings 12 and 13 provided in the pieces 5 and 8 respectively, and also through openings in the frame, the ends of the bolts being provided with tightening nuts 16. Each piece 5 is provided with a recess 17 in which snugly fits the frame. It will be understood that there is provided a similar arrangement on the opposite side of the machine. The pieces 8 are each provided with a socket 8' which sockets are for the reception of the hubs on the wheels and are provided also with an overhanging lip $8^2$ which overlies the hub, the whole forming a dirt proof arrangement.

The frame 10 is preferably constructed of flat steel and is bent into a U-shape and is provided with brace bar 18, the ends of which are bent downwardly and are bolted to the frame 10 as at 19 upon the inner sides of said frame. The rear end of the draft tongue 19' is bolted as at 20 to the said bar 18.

To the frame 10 is pivotally connected a metal frame 20' which carries the cutting cylinder presently described, and this frame 20' is bent into a U-shape and to the forward ends of the arms 22 of said frame 20' are bolted metal sockets 23 through which pass the ends of a rod 24 which also pass through the arms 10' of the frame 10 and are threaded upon the outside to receive nuts 26. A tubular piece 27 braces the ends of the arms of frame 20' and the rod 24 which pivotally connects the frames 10 and 20' passes through said tubular piece.

30 indicates the cylinder for supporting the cutting blades. This cylinder comprises two cast metal flanges 31 provided with a plurality of spokes 32, which are slightly pitched forward and the outer end of each spoke is provided with a shoulder 33 against which rest the cutting blades 34. These blades 34 are beveled at their outer edges to provide a sharp cutting edge and each blade is bolted to its pair of supporting spokes by bolts 36. This construction and arrangement of the cylinder and cutting blades is extremely simple, light and durable and the blades are firmly supported in position during the cutting operation. The cylinder is adapted to be rotatably supported by the frame 20′ and I provide boxes 38 which have arms 39 bolted as at 40 to the arms of the frame 20′ said arms 39 being provided with recesses 42 within which snugly fit the arms of the frame 20′. The boxes 38 are provided with bearing apertures within which are rotatably mounted annular rods or trunnions 43 cast with the flanges of the cylinder and constituting a dirt proof arrangement. The boxes 38 are each provided with an oil hole 44 for lubricating, and with a rib 42′ to give strength to the boxes.

It will be understood that the cutting cylinder will be adapted to be adjusted simultaneously with the frame 20′ to thereby raise or lower the cutting blades whereby to regulate the pressure on the stalks. When the machine is being carried on or off the field the frame 20′ and cylinder carried thereby may be raised sufficiently high to clear the ground or any obstructions, and in practice a vertical adjustment of five inches will be found sufficient.

For the purpose of raising and lowering the frame 20′ and the cutting cylinder I provide the following means. 45 indicate two rods, the lower ends of which are bent inwardly and pass through the arms of frame 20′ and are provided with cotter pins 46 to retain the rods in position. The upper ends of the rods 45 are provided with eyes through which loosely pass short studs or nubs 47 cast with arms 48 and 49 which are cast integral with sleeves 50 and 50′ provided with square apertures 51 51ᵃ respectively through which pass the ends of a square rod 52. The bearing sleeves are secured to the ends of the rod by means of set screws 54. One of the bearing sleeves as 50 is provided with an integral arm 55 to which is bolted the operating lever 57 by means of bolts 56. The arm 55 is provided with a rectangular recess 56′ within which snugly fits the operating lever and with holes 57′ for the passage of the bolts 56.

It will be seen that by shifting the lever in opposite directions the frame 20′ and cutting cylinder carried thereby may be adjusted toward or from the ground and the lever may be held in adjusted position by means of a toothed quadrant 58. The quadrant 58 is provided with an eye within which fits the inner end of the sleeve 50, and 60 indicates a casting provided with an eye 61 within which fits the inner end of the sleeve 50′. The casting 60 is provided with apertures 63, 64. Through the apertures 63 pass two machine bolts 66 which secure the casting to the axle and through the apertures 64 pass the ends of a U-bolt 67 which embraces the axle and secures the casting 60 to the latter. The under side of the casting is provided with a semi-circular groove 68 to receive within it the axle. The quadrant 58 is integral with a casting 70 provided upon its under side with a semi-circular groove 71 to receive the axle. Through the casting pass two machine bolts 75 securing the casting to the axle, while through apertures 74 in the casting pass the ends of a U-bolt 75′ which clamps the casting to said axle. A spring actuated dog 78 carried by the operating lever is adapted to be engaged with the teeth of the quadrant and to hold the parts in adjusted position.

80 and 80′ indicate brace strips, the lower ends of which are bolted as at 81 to the frame 10 and said brace strips pass upwardly and are twisted to rest under the axle flatwise and said braces are engaged by the machine bolts 66 and 75 which secure the castings 60 and 70 to the axle.

85 indicates a metallic bar, one end of which is bent as at 86 and is bolted as at 87 to the draft tongue. The bar 85 is curved upwardly and supports a seat 87 for the operator in convenient position to operate the adjusting lever for the cutting cylinder and frame 20.

90 indicates a rake comprising two bars 91 and 92 constructed preferably of steel and bent into the form seen more particularly in Fig. 7. The lower ends of the rake bars constitute teeth adapted when in normal lowered position to engage beneath the stalks and raise them from the ground into position to be operated upon by the cutting blades. The rake bars pass through eyes 93 and 94 formed at the lower ends of a metallic strip 95 which is bent somewhat into U-shape and is pivotally connected to the draft tongue by a bolt 96 which passes through a hole cut in the upper face of the tongue and covered by the lower bent end of the seat bar. The upper U-shaped end of the strip is arranged in a convenient position to be operated by the foot of the operator. By pressing the strip forwardly, the rake teeth will be swung rearwardly and upwardly from the ground, while upon releasing the strip the weight of the rake bars will cause the teeth to descend again into proximity to the ground.

The rake bars at their upper ends pass loosely through apertures in castings 97 and 98 which are bolted as at 99 to the frame 10 and the extreme ends of the rake bars are provided with cotter pins 99′ to maintain said bars in position. It will be seen that the rake bars can readily turn in the castings 97 and 98.

100 indicates a curved sheet metal apron or fender which is riveted or otherwise secured to two curved metal bars 101 which at their lower ends are bent forwardly and rest upon the bars 18 and are bolted thereto as at 102 and are secured at their upper ends to the axle by means of the U-bolts 67 and 75'. To the bent ends of the bars 101 is bolted a metal foot rest 106 by means of bolts 107.

What I claim is:—

1. In a machine of the character described, the combination with the pivotally connected frames 10 and 20' and a cutting cylinder rotatably carried by the frame 20', of means for raising and lowering the frame 20' comprising rods 45, having bent ends passing through the arms of frame 20' and having eyes, sleeves 50, 50' having integral arms 48, 49 carrying nubs which fit within said eyes, and said sleeves having square apertures 51, 51ᵃ, a square rod 52 passing through said apertures, set-screws securing the sleeves to the rod, an arm 55 on sleeve 50, an operating lever 57 bolted to arm 55, said arm 55 having a rectangular recess 56' receiving the operating lever, a quadrant 58 having an eye within which fits the inner end of sleeve 50, and a casting 60 having an eye within which fits the inner end of sleeve 50', said casting 60 also having apertures 63, 64, machine bolts passing through the said apertures, the ground wheel axle embraced by said bolts, and seated in a groove in the casting, a casting 70 integral with the quadrant and having a groove 71 to receive the axle, machine bolts passing through the casting 70, and securing the casting 70 to the axle, and a U-bolt passing through the casting 70 and embracing the axle, and a spring actuated dog carried by the operating lever and engaging the quadrant.

2. The combination with the frame 10, of brace strips 80 80' bolted to the frame and twisted as described, and the axle 3 mounted in said frame and having the shape described, and under the horizontal portion of which axle the strips bear flatwise, and means for securing the strips to the axle comprising castings 60 and 70 each having a semi-circular groove within which lies the horizontal portion of the axle, and bolts passing through the castings and the flat portions of the strips as described.

3. The combination with the axle, of the bar 18, the two curved metal bars 101 bolted at their lower ends to the bar 18, and U-bolts 67 and 75' securing the upper ends of the bars 101 to the axle, and a metal foot rest bolted to the bars 101.

In testimony whereof I affix my signature in presence of two witnesses.

JOHN A. McKAY.

Witnesses:
H. P. HOWARD, Jr.,
W. E. BOULTER.